US012580382B2

(12) United States Patent
Brombach et al.

(10) Patent No.: US 12,580,382 B2
(45) Date of Patent: Mar. 17, 2026

(54) METHOD FOR DETECTING A POWER LOSS WHEN OPERATING A WIND POWER INSTALLATION OR A WIND FARM

(71) Applicant: Wobben Properties GmbH, Aurich (DE)

(72) Inventors: Johannes Brombach, Berlin (DE); Kristof Woll, Bremen (DE); Menko Bakker, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 893 days.

(21) Appl. No.: 17/582,963

(22) Filed: Jan. 24, 2022

(65) Prior Publication Data

US 2022/0239099 A1    Jul. 28, 2022

(30) Foreign Application Priority Data

Jan. 25, 2021    (EP) ..................................... 21153308

(51) Int. Cl.
H02J 13/00       (2006.01)
H02J 3/0012      (2026.01)
H02J 3/16        (2006.01)
H02J 3/38        (2006.01)

(52) U.S. Cl.
CPC .............. H02J 3/0012 (2020.01); H02J 3/16 (2013.01); H02J 3/381 (2013.01); F05B 2270/1033 (2013.01); H02J 2300/28 (2020.01); Y02E 10/76 (2013.01)

(58) Field of Classification Search
USPC ........................................................ 700/295
See application file for complete search history.

(56) References Cited

U.S. PATENT DOCUMENTS

| | | | | |
|---|---|---|---|---|
| 2006/0034103 | A1* | 2/2006 | West ................... | H02M 1/0043 |
| | | | | 363/39 |
| 2011/0106325 | A1* | 5/2011 | Opina, Jr. ................. | H02J 3/40 |
| | | | | 700/287 |
| 2013/0038133 | A1* | 2/2013 | Bech ....................... | H02J 3/381 |
| | | | | 307/83 |
| 2015/0054443 | A1* | 2/2015 | Swamy ................... | H02P 23/06 |
| | | | | 318/504 |

FOREIGN PATENT DOCUMENTS

| | | | | | |
|---|---|---|---|---|---|
| DE | 102007041793 | A1 * | 3/2009 | ........ | G01R 21/1331 |
| WO | WO-2018116823 | A1 * | 6/2018 | ................ | H02J 3/16 |

* cited by examiner

*Primary Examiner* — Emilio J Saavedra
(74) *Attorney, Agent, or Firm* — Seed Intellectual Property Law Group LLP

(57)    ABSTRACT

Provided is a method for detecting a power loss when operating a wind power system including a wind power installation and which feeds electrical power into a grid. The electrical power is fed into the grid with an active and reactive power component at a current operating point. The method includes detecting an overall power loss caused by feeding in the electrical power at the current operating point, and estimating a reactive power loss caused by feeding in the reactive power component at the current operating point. The reactive power loss is determined from a difference between the overall power loss and an active power loss assigned to the current operating point. The active power loss corresponds to a power loss of a comparison operating point where the same amount of active power is fed in as at the current operating point, but no reactive power is fed in.

17 Claims, 4 Drawing Sheets

METHOD FOR DETECTING A POWER LOSS WHEN OPERATING A WIND POWER INSTALLATION OR A WIND FARM

BACKGROUND

Technical Field

The present invention relates to a method for detecting a power loss when operating a wind power system comprising at least one wind power installation. Moreover, the present invention relates to a corresponding wind power system.

Description of the Related Art

A wind power system relates to a wind power installation or a wind farm comprising a plurality of wind power installations. In particular, this relates to a wind farm. However, the problems described might also occur in the case of a single wind power installation. Wind farms are known and feed electrical power generated by wind into an electrical supply grid, specifically at a grid connector. What must also be considered in addition to the infeed of active power for supplying consumers connected to the electrical supply grid is that reactive power is fed in by such a wind park, in particular for grid support.

Reactive power can be fed in especially upon request by a grid operator in particular. By way of example, the wind farm may receive, to this end, a setpoint value for feeding in reactive power. Reactive power must then be fed in at this level.

Grid operators exploit the grid properties of modern wind power installations and especially of wind farms to an ever greater extent in order to carry out active grid management. In this case, reactive power from wind power installations is used especially to maintain the voltage and for reactive-power balancing adjustment.

As a result of the apparent current increase, operating point-dependent losses arise in the inverters if reactive power is demanded, reducing the economic efficiency of wind power installations and wind farms.

In principle, reactive power compensation may be demanded in this case. However, a compensation needs the losses to be detected. Determining actual losses is becoming ever more important, also for cost-benefit planning.

In principle, losses of the wind farm or of the wind power installations are determinable but it is problematic to assign the current overall losses to the respective cause, that is to say the active power infeed on the one hand and the additional reactive power infeed on the other hand. In particular, this is complicated by the fact that the power loss depends on the operating point and the operating point is constructed on the basis of the active power infeed and the reactive power infeed, without a linear superposition being present.

In principle, the losses here are at least constructed from reactive power-dependent active power losses and also inverter losses, and it would be desirable to detect these.

One option for detecting such losses would consist of carrying out a model-based, retrospective determination of the losses caused by reactive power. However, such a determination is very inaccurate.

The European Patent Office searched the following prior art in the priority application relating to the present application: DE 10 2007 041 793 A1.

BRIEF SUMMARY

One or more embodiment are directed to determining a power loss as accurately as possible and/or a resultant energy loss caused by a reactive power infeed.

A method for detecting a power loss when operating a wind power system is proposed, said wind power system feeding electrical power into an electrical supply grid at a grid connector. The wind power system comprises at least one wind power installation. Consequently, the wind power system may correspond to a wind power installation, including the infrastructure up to the grid connector, or to a wind farm. A wind farm has a plurality of wind power installations which are connected to the electrical supply grid via the same grid connector.

It is further proposed that, at a current operating point, the wind power system feeds electrical power with an active power component and a reactive power component into the electrical supply grid. Active power and reactive power are therefore fed in simultaneously and this combined feeding in consequently also determines the current operating point.

In this context, the detection of an overall power loss caused by feeding in the electrical power at the current operating point is now proposed as one step. By way of example, this overall power loss can be detected in such a way that all current power losses in the wind power system and all losses in the wind power installation, at least in the inverter system with which the electrical power is prepared to be fed in, are detected. By way of example, this can be implemented by way of appropriate current and voltage measurements. Losses in the generator need not be detected since these are not required and, in particular, are not considered losses caused by the feed-in and at least can be neglected.

As a further suggestion, estimating a reactive-power power loss caused by feeding in the reactive power component at the current operating point is proposed. The reactive-power power loss consequently is the power loss that can be assigned to the reactive power component. It cannot be readily measured and is therefore estimated as explained below.

Here, the reactive-power power loss is determined from a difference between the overall power loss and an active-power power loss assigned to the current operating point. The active-power power loss corresponds to a power loss of a comparison operating point in which the same amount of active power is fed in as at the current operating point but no reactive power is fed in.

Consequently, the active-power power loss is a power loss arising at an operating point where only active power is fed in. Such an operating point is the comparison operating point mentioned.

Thus, in the simplest case, the wind power system can be operated at the comparison operating point in a preliminary examination. To this end, exactly the same amount of active power is fed in as in the now current operating point but no reactive power is fed in.

Naturally, very different operating points may occur, also with different amounts of active power infeed; this depends in particular on the available wind. Therefore, active-power power losses can be recorded for many comparison operating points. This will still be described in detail in embodiments below. In any case, the power loss for each comparison operating point, which then forms the active-power power loss since no reactive power is fed in, should also be detected such that, in particular, all losses of the lines of the wind power system and losses of the one or more wind power installations, in particular of the inverters thereof, are detected. The power loss detected thus can be stored as active-power power loss together with the comparison operating point.

Consequently, to subsequently estimate the reactive-power power loss of the current operating point, the following procedure is carried out: A comparison operating point that fits to the current operating point is searched for in the memory and the active-power power loss stored therewith is used and subtracted from the overall power loss of the current operating point. The result is the sought-after reactive-power power loss.

This is based, in particular, on the following idea: In most cases, the current operating point causes more power loss as a result of the reactive power infeed. However, said increased power loss does not only arise directly from the reactive power component but also as a result of there being an increased load on the wind power system overall. By way of example, a power loss arising due to the reactive power component could be calculated at an electrical component such as a choke, a transformer or a transmission line. However, the fact that the reactive power is not fed in alone but together with the active power would remain unconsidered in this case; in particular, this may lead to an increased temperature in the aforementioned components. This leads to an additional increase in the power loss caused by the reactive power infeed. This additional power loss cannot readily be taken into account purely by considering the feeding in of the reactive power component.

Therefore, the specified solution is proposed. Consequently, the specified solution can specifically detect the actual power loss in the case of a pure active power infeed, and hence any additional power loss at the current operating point should be assigned to the additional reactive power infeed.

One aspect proposes, in preliminary examinations and at at least one reference operating point in each case, to feed in active power but no reactive power, to detect a power loss as a reference power loss, and to store the detected reference power loss and the fed-in active power of the reference operating point together as reference values. The active-power power loss of the current operating point can be determined from at least one stored reference power loss respectively of a reference operating point.

For such preliminary examinations, the wind power installation can be operated at such reference operating points in a targeted fashion, that is to say with active power infeed but without reactive power infeed. The power loss for each reference operating point can be detected and stored. Hence, it forms a reference power loss of the relevant reference operating point. It is stored together with the fed-in active power as a reference value.

The intention is to construct a database in this way, said database having a reference power loss for as many reference operating points as possible. The reference power loss is then assigned to the fed-in active power in each case. Thus, if the active-power power loss is required for an active power value of the current operating point, the former can be retrieved from the database by virtue of using the reference power loss, stored for this purpose, for the fed-in active power of the current operating point. In the simplest case, the reference power loss retrieved thus can directly form the sought-after active-power power loss. However, further modification of the retrieved reference power loss may also need to be considered.

A further modification must be considered for two cases in particular. In the first case, a reference operating point whose fed-in active power corresponds exactly to the fed-in active power of the current operating point is not (yet) available. In the second case, which may also be combined with the first case, other boundary conditions deviate from one another. Thus, what may apply is that, in a simple example, there is a reference operating point with the same active power infeed as a current operating point, but the two operating points were recorded at different external temperatures. This may have an effect on the power loss and this effect should be considered.

Recording of the reference operating points in preliminary examinations can also be implemented by virtue of the wind power installation being operated completely normally. Operating points in which no reactive power and only active power is fed in also occur frequently during such normal operation. Such operating points can then be used as reference operating points and the active power of the reference operating point can be stored together with the power loss. As a result, a database can be constructed gradually during running operation of the wind power installation. Should there be active power ranges in which reactive power is always fed in as a matter of principle, operating points without reactive power infeed can be homed in on, out of sequence, in a targeted manner for the purposes of preliminary examinations.

Optionally, provision is made for the detected reference power loss to be stored together with the fed-in active power and additionally with at least one boundary condition of the comparison operating point as reference values. By way of example, a grid voltage can be such a boundary condition. What was recognized here is that, in addition to the active power infeed, such boundary conditions can equally characterize both the current operating point and the reference operating point, and hence also the comparison operating point. By way of example, if the grid voltage is 10 volts above a grid nominal voltage, this can make the feed-in more difficult and hence lead to higher power losses. This effect may occur for the infeed with or without reactive power. Thus, should the grid voltage of the current operating point be above the grid nominal voltage by the 10 volts mentioned in exemplary fashion, the reference operating point should ideally also belong to a grid voltage that was 10 volts above the grid nominal voltage.

Even if such coincidence cannot necessarily be achieved, especially if further boundary conditions are considered, it is important to take these boundary conditions into consideration. To this end, they should also be stored. If there are deviations between the boundary conditions of the current operating point and the boundary conditions of the utilized reference operating point, these may be removed by calculation in certain circumstances.

What is proposed, in particular, is that the active-power power loss of the current operating point is determined from at least one stored reference power loss respectively of a reference operating point such that a reference operating point is chosen on the basis of the current operating point and the reference power loss stored therewith is used as active-power power loss, or the active-power power loss is extrapolated from the stored reference power loss. Ideally, the reference operating point is chosen such that it has the same fed-in active power as the current operating point. If possible boundary conditions then either appear negligible or are sufficiently similar, the reference power loss stored for this reference operating point may also form the sought-after active-power power loss of the current operating point. However, this rather forms an ideal case, which, however, explains the principle well.

However, if deviations occur, for example between the fed-in active power of the reference operating point on the one hand and of the current operating point on the other hand, then an extrapolation can be carried out. By way of example, if a reference operating point for which the fed-in active power of the current operating point is 10% above the fed-in active power of the reference operating point was found and selected, this can be considered accordingly in relation to the active-power power loss. Thus, in this exemplary case, a value which is 10% above the reference power loss of the reference operating point can be adopted for the active-power power loss of the current operating point.

A similar procedure can also be adopted for deviations in respect of the boundary conditions. By way of example, picking up on the example above, should it be known that a grid voltage increase of 10% in relation to the grid nominal voltage leads to an increase in the power loss of approximately 5%, then this can be taken into account accordingly. To express this in general terms, it is therefore possible to detect a relationship between, firstly, a voltage overshoot or reduction in the grid voltage, respectively in relation to the grid nominal voltage, and, secondly, a correspondingly increased or reduced power loss.

Such relationships may have been detected by further preliminary examinations. Thus, it is possible that such a relationship between voltage overshoot and power loss overshoot was detected for reference operating points of different active power values to the active power value of the current operating point, and hence of the selected reference operating point. The assumption can be made that the influence of the boundary conditions is small enough for it to be transmittable from one value of fed-in active power to another value of fed-in active power.

To determine the active-power power loss of the current operating point, it is also possible to consider a plurality of reference operating points being selected on the basis of the current operating point from at least one stored reference power loss respectively of a reference operating point, and the active-power power loss being interpolated or extrapolated from the reference power losses stored in relation thereto. What can be considered here, in particular, is that two reference operating points with different fed-in active powers are selected, with the fed-in active power of the current operating point being located between these two different active power values of the two reference operating points. Expressed differently, the ideal reference operating point is located between these two selected reference operating points. Accordingly, it is possible to interpolate between these two selected reference operating points, that is to say these two present or stored reference operating points.

However, it is also possible to extrapolate from two or more reference operating points, for example if the two selected reference operating points have different fed-in active power values, but these are both less than the fed-in active power of the current operating point. A possible increase in the power loss of the reference power losses of the two reference operating points can then be linearly extrapolated up to the current operating point. In this context, it may also be considered as a matter of principle that more than two reference operating points are selected and, for example, a curve of corresponding order is found.

The same also applies to the interpolation. What should also be considered here is that boundary conditions can additionally also be considered in addition to the interpolation or extrapolation in respect of different underlying active power values. Ideally, the number of reference operating points selected exceeds the number of considered changeable parameters by at least one. Thus, if two boundary conditions are considered as two further parameters in addition to the active power as one parameter, then three parameters are present and four reference operating points can then be considered in order to consider these three parameters by interpolation or extrapolation, or a combination thereof.

One aspect proposes that if the wind power system comprises a plurality of wind power installations, there are preliminary examinations comprising the following for determining the active-power power loss: each wind power installation is respectively operated at at least one installation reference operating point with an installation active power, a power loss of the wind power installation is detected in each case as an installation reference power loss, and the captured installation reference power loss and the associated installation active power are stored. Optionally, an output reactive power is additionally stored and, moreover or as an alternative, at least one boundary condition can additionally also be stored therewith.

What is considered in this respect is that a reactive power was output by the respective wind power installation. However, the summation of all output reactive powers of the wind power installations may be zero, and so no reactive power is fed in at the grid connector, which may also be referred to synonymously as grid node.

In this case, too, the grid voltage in particular can be considered for the boundary conditions again, as well as further boundary conditions which were already described above or will be described below.

Provision is now made for the active-power power loss of the current operating point to be determined from respectively at least one stored installation reference power loss of each wind power installation. What was identified here, in particular, is that the power losses occur at the wind power installation in particular and can also be detected well there. Therefore, an individual consideration of each individual wind power installation is proposed.

Consequently, at least one installation reference power loss is stored together with the associated installation active power for each wind power installation. Consequently, proceeding from the active power component of the current operating point, corresponding installation reference operating points or the values stored in this respect are sought after and called in order to ascertain an active-power power loss of the current operating point.

By way of example, if the current operating point has an active power of 20 megawatts (MW) which is distributed uniformly among ten wind power installations, then each wind power installation has an active power of 2 MW. Matching this, that is to say matching the 2 MW, the installation reference operating point and the reference values stored in this respect are respectively accordingly selected and called.

However, it is also possible for the active power component of the current operating point not to be uniformly distributed. One reason for this may be, for example, that the wind power installations are not of equal size and/or the wind locations of the individual wind power installations differ, and so the wind power installations receive different amounts of wind, to mention but two examples which may also occur in combination.

Ideally, the installation reference operating points for determining the active-power power loss of the current operating point are chosen such that the summation of their installation active powers corresponds to the active power component of the current operating point.

In particular, what is proposed is that a stored installation reference power loss is called or extrapolated for each wind power installation on the basis of the active power component of the current operating point, or is determined from a plurality of stored installation reference power losses by interpolation or extrapolation. In this respect, the same procedure as already described above for the wind power system overall is carried out for each individual wind power installation.

Then, the active-power power loss is determined from a summation of all called installation reference power losses or installation reference power losses determined by interpolation or extrapolation.

The boundary conditions can be considered individually for each wind power installation in order thereby to obtain, for each wind power installation on an individual basis, the best possible value of the installation reference power loss. Considering a reactive power output by a wind power installation in each case can also come into question for a further quantity here. The reference values should be determined for a situation in which the fed-in reactive power is zero. However, if a wind farm is used, that is to say if the wind power system comprises a plurality of wind power installations and therefore is a wind farm, it may be the case that the individual wind power installations output reactive power but no reactive power is fed in at the grid connector. One reason for this may lie in mutual cancellation of the individual reactive powers of the respective wind power installations. What is consequently proposed is that the installation reference operating points are chosen such that, overall, they lead to an overall reference operating point of the wind power system in which no reactive power is fed in.

What might also be considered is that even in the case of a single wind power installation, the latter outputs reactive power but said reactive power is entirely "consumed" along the transmission path from the wind power installation to the grid connector, that is to say in particular on a farm line from the wind power installation to the grid connector. Thus, the wind power installation outputs an apparent current with a phase angle not equal to zero, with this phase shift however being compensated by the impedance between wind power installation and grid connector. Thus, the phase angle at the grid connector then is zero.

What was identified here, in particular, is that, as a matter of principle, reactive power compensation is considered for reactive power fed into the electrical supply grid but not for reactive power required or consumed within the wind farm.

One aspect proposes that the comparison operating point and the current operating point are each formed from installation operating points, in particular in such a way that the active power component of the current operating point or of the comparison operating point is formed from a summation of the active powers of the installation operating points of all wind power installations, and the reactive power component of the current operating point or of the comparison operating point is formed from a summation of all reactive powers of the installation operating points of all wind power installations and of the reactive power need of the farm grid.

This makes it clear how the current operating point and the comparison operating point are constructed, specifically if the wind power system comprises a plurality of wind power installations.

However, the reactive power component of the comparison operating point should be zero such that the summation of all reactive powers of the installation operating points and of the reactive power need of the farm grid, that is to say, expressed differently, the reactive power consumption of the farm grid, is zero.

In particular, the installation operating points for the comparison operating point are chosen such that the summation of their active powers corresponds to the summation of the active power for the case of the current operating point.

The summation of all reactive powers of the installation operating points and of the reactive power need of the farm grid should be zero for the comparison operating point. In particular, this means that the summation of all reactive powers of the installation operating points of the comparison operating point corresponds, in terms of absolute value, to the reactive power need of the farm grid or to the reactive power consumption of the farm grid. Thus, the reactive powers of the individual installations of the comparison operating point are only used to satisfy the reactive power need of the farm grid.

One aspect proposes that a reference power loss or the reference power loss detected in preliminary examinations is stored together with one or more operating point boundary conditions. Such operating point boundary conditions consequently characterize the respective reference operating point or installation reference operating point. What was identified here, in particular, is that the reference operating point or installation reference operating point, in addition to its active power, can be specified by further operating point boundary conditions. Consequently, for the purposes of determining the active-power power loss of the current operating point, one or more reference operating points, one or more installation reference operating points can be found in improved fashion.

Such operating point boundary conditions can be a grid voltage of the electrical supply grid, a reactive power generated by at least one wind power installation, a DC link voltage of an inverter of the at least one wind power installation, and an external temperature. These operating point boundary conditions may also be combined; thus, a plurality of these can be used to specify the respective operating point as accurately as possible. In particular, what is proposed is that the grid voltage and the reactive power are detected and in each case also stored as operating point boundary conditions.

What was identified here, in particular, is that the level of the grid voltage can influence how the respective wind power installations operate in order to feed in an infeed current. The higher the grid voltage, the more complicated it may be to feed the current, to be fed in, into the grid against this grid voltage.

For this reason, it may also be expedient to consider the DC link voltage of an inverter of the at least one wind power installation since the DC link voltage can be an indicator for the grid voltage; however, the DC link voltage may also characterize the operating point of the wind power installation. Moreover, the feed-in may be simpler the higher the DC link voltage.

It is also proposed to record a reactive power generated by the respective wind power installation and to store this as operating point boundary conditions. No reactive power should be fed into the electrical supply grid for the determination of the reference operating point or the installation reference operating points. Expressed differently, the active-power power loss should be determined as power loss of a comparison operating point, by virtue of feeding in the same amount of active power as in the case of the current operating point but not feeding in any reactive power. Equally, it is possible to consider that the wind power installations generate a reactive power but the latter is consumed in the wind farm such that a reactive power can be detected at a farm level, in particular per wind power installation, but equally no reactive power is fed in at the grid connector or grid node.

It also comes into question that a single wind power installation, which feeds in at a grid node on its own, generates a reactive power which, in particular, is consumed on the transmission path from the wind power installation to the grid connector or grid node.

The external temperature, in particular measured at a wind power installation, for example at the foot of the tower or on the nacelle, may also form an operating point boundary condition. What was identified here, in particular, is that different power losses may occur in summer and winter and/or during the day and at night, despite the same active power, reactive power and grid voltage.

One aspect proposes that to detect power losses of the wind power installations, one, more or all of the following power loss boundary conditions are detected and used in each case. These possible power loss boundary conditions are the grid voltage of the electrical supply grid, a DC link voltage of an inverter of the wind power installation, a cooling water temperature of the inverter of the wind power installation, a switching frequency of the inverter, a current tolerance bandwidth of the inverter and a temperature of at least one semiconductor switch of the inverter of the wind power installation. The wind power installation may also be considered to include elements arranged outside of the wind power installation or at least arranged on the output side of the respective inverter. In particular, these include chokes.

Naturally, the power losses of the wind power installations substantially depend on the fed-in current or the output power, be it apparent or active current, or apparent or active power. However, the same active current may lead to different power losses and the latter may depend on the specified power loss boundary conditions.

The grid voltage may influence the current operating point as explained above; this also has an influence on the power loss.

A DC link voltage of the inverter of the wind power installation can also influence the power loss for the afore-mentioned reasons. In principle, current can be fed in better at a high DC link voltage but relatively high losses may arise when entering a generator current into a DC link with a high DC link voltage. Both may influence the power loss of the respective inverter.

A cooling water temperature of the inverter allows conclusions to be drawn about the thermal energy generated, which arose during the operation of the inverter and which was output to the cooling water. However, the cooling water temperature on its own is not meaningful since the semi-conductor switches cooled therewith do not emit their temperature exclusively to the cooling water. However, such a cooling water temperature is well suited to being a boundary condition.

A temperature of at least one semiconductor switch of the inverter likewise allows conclusions to be drawn about the power converted within the respective semiconductor switch. In particular, the temperature of the semiconductor switch, together with the cooling water temperature, can allow a good conclusion to be drawn about the energy converted into heat, and hence about losses. Figuratively speaking, a semiconductor switch may have different temperatures when converting the same thermal losses depending on the quality of its cooling and hence depending on the cooling water temperature.

A temperature of a semiconductor switch can relate to a temperature on the semiconductor switch, on what is known as a bonding which is used to contact the semiconductor switch, or a temperature within the semiconductor switch. An appropriate temperature sensing device may be integrated into the semiconductor switch for a temperature within the semiconductor switch, or the temperature in the interior of the semiconductor switch can be ascertained from other temperatures that are more easily measurable, in particular from temperature profiles of other, better detectable temperatures.

A switching frequency of the inverter may likewise help to detect the power losses. It is also easily explainable here that the switching frequency on its own is little meaningful and only becomes meaningful together with the amplitude of the fed-in current, or a comparable quantity. This is because the switching frequency is less related to the level of the fed-in current, that is to say in relation to its root mean square value, and more related to the quality of the sinu-soidal current to be generated.

A similar statement is true in relation to a tolerance bandwidth of the inverter if the latter specifically generates sinusoidal current by means of a tolerance band method. The narrower the tolerance band, that is to say the smaller the tolerance bandwidth, the higher the switching frequency of the inverter can also become. In this case, too, the tolerance bandwidth is not necessarily related to the absolute value of the fed-in current.

The faster switching is carried out, the more often switch-ing is consequently also carried out, and losses at semicon-ductor components occur as a result of the switching process in particular. In this case, however, the level of the current is also important because the higher the current to be generated, the higher also the current that flows through the respective semiconductor.

In particular, what is proposed is that these power loss boundary conditions are detected and the power losses are derived therefrom. To this end, it is possible to create or use models which establish corresponding relationships between these boundary conditions and, of course, the absolutely generated current as well. If such relationships do not exist, they can be ascertained in preliminary examinations. Optionally, they may also be ascertained in test apparatuses which, for example, contain more measurement technology for detecting such losses than a normal wind power instal-lation would have during normal operation. Once these relationships are known, it may be sufficient to consider the fed-in current and the power loss boundary conditions in order to detect the power losses on the basis thereof.

One aspect proposes that to detect the power losses of the wind power installations, or of one of the wind power installations, one, more or all of the power losses mentioned below are measured, calculated or detected in any other way. These include forward power losses, in particular of semi-conductors and diodes of respectively one inverter arrange-ment, or the inverter arrangement, losses at chokes at an output of the inverter arrangement, losses in lines between a wind power installation and a grid connector, or the grid connector, and switching losses, in particular of semicon-ductor switches of the inverter arrangement and/or diodes of the inverter arrangement. In particular, it is proposed that the switching losses be calculated for each switching procedure.

Forward power losses afflict semiconductors and diodes in particular. Especially when the current flows, there are voltage drops at depletion layers which lead to corresponding forward power losses. These can be detected if the current and the applied voltage and the properties of the relevant semiconductor component are known.

Losses at chokes may also depend not only on the current level but also on the current quality, in particular on the ripple, and can be calculated in the case of corresponding knowledge of the current characteristic and the choke.

A similar statement applies to losses in lines, in particular transmission lines, which stretch from the wind power installation to the grid connector. Losses in such lines may also additionally depend on the current characteristic. Line losses in switchgear cabinets of the wind power installations also come into question.

Switching losses relate in particular to the respective transition between blocking and transmitting semiconductor component element. Here, there is a transition region in which the current increases and the voltage drops, or vice versa, during switching. This may relate to the switching of the semiconductor switch, which is accordingly driven thereto. However, this may also relate to indirect switching of a diode by a voltage or current reversal. Such switching processes may be observed and the switching losses may be derived, especially if the utilized semiconductor components are correspondingly known and/or if the currents and voltages at the components are detected correspondingly accurately.

In particular, it is proposed that the switching losses be calculated for each individual switching procedure. What was especially recognized in this case is that such switching processes may be very individual. Particularly for generating a sinusoidal current, the current and voltage amplitude changes constantly, that is to say at each switching process.

In the case of a tolerance band method in particular, the instantaneous value of the generated current is detected without interruption in any case, so as to be able to control or operate the tolerance band method. These values can then also be used to determine the switching losses. This is proposed herewith in order to obtain the greatest possible accuracy.

One aspect proposes that the reactive-power power loss is integrated over time in order to detect a reactive-power energy loss caused by a reactive power infeed, or that a respective installation reactive-power power loss is determined for each wind power installation on an individual basis and integrated over time to form an installation reactive-power energy loss. Thus, two variants are proposed.

According to the first variant, the reactive-power power loss is determined for all wind power installations, that is to say for the wind farm, and then integrated to form the reactive-power energy loss. In the second case, the integration is implemented in or for each wind power installation. Only the amounts of reactive-power energy losses ascertained at each wind power installation are summed. An advantage of this second variant is that the energy loss, that is to say the installation reactive-power energy loss, can be ascertained for each individual wind power installation, in particular independently of the other wind power installations.

At the end of the ascertainment interval, the wind power installation then only needs to output one value, which is combined, more particularly added up, with corresponding values of all wind power installations to form the reactive-power energy loss of the wind farm. In return, the farm-wise integration of the reactive-power power loss may have the advantage that farm influences can be better considered.

For the farm-wise determination of the reactive-power energy loss, that is to say for the first case, detection of the overall power loss at the grid connector, or detection of the installation power loss at a respective output of each wind power installation and the addition thereof to detect the overall power loss, is proposed. Thus, the overall power loss can be determined in two ways. If the overall power loss is detected at the grid connector, an active-power power loss should also be subtracted from it overall.

Alternatively, installation power losses can be respectively captured at an output of each wind power installation. In this case, these can be added to detect the overall power loss and the active-power power loss can then be subtracted therefrom in order to obtain the reactive-power power loss. However, initially subtracting an installation active-power power loss from the installation power losses in each case in order thereby to obtain an installation reactive-power power loss for each wind power installation also comes into question. All these installation reactive-power power losses can then be added up to form the reactive-power power loss which then relates to the entire farm. This is then integrated to form the reactive-power energy loss.

If an installation reactive-power power loss is ascertained on an individual basis for each wind power installation and integrated over time to form an installation reactive-power energy loss, the determination of the installation reactive-power power loss from a difference between a power loss of the wind power installation at the current operating point and an installation reference power loss is also proposed in this case. The installation reference power loss is derived from a stored installation reference power loss or is determined from a plurality of stored installation reference power losses by interpolation or extrapolation. Details in this respect were already described above. The reactive-power energy loss of the wind power system is then formed as the summation of the installation reactive-power energy losses of all wind power installations.

One aspect proposes that to detect the overall power loss at the current operating point, transmission losses between the at least one wind power installation and the grid connector are considered. Moreover or alternatively, to detect the active-power power loss at the respective reference operating point, transmission losses between the at least one wind power installation and the grid connector are considered. In addition or alternatively, to detect an installation reference power loss at the respective reference installation operating point, transmission losses between the wind power installation and the grid connector are respectively considered.

What was identified here, in particular, is that transmission losses between the at least one wind power installation and the grid connector may be relevant. The overall power loss may contain such transmission losses and such transmission losses may also be present at the reference operating point or the reference installation operating points. Hence, the transmission losses may also be contained in the active-power power loss. If the transmission losses are considered both in the overall power loss and in the active-power power loss, it is hence also possible to consider the transmission losses for the reactive-power power loss. In principle, the transmission losses of the reactive-power power loss arise from the difference between the transmission losses of the overall power loss and the transmission losses of the active-power power loss.

One aspect proposes that to detect the reactive-power power loss for each wind power installation, an installation reference operating point is determined on the basis of the active power of the current operating point and on the basis of a phase shift between an output voltage at the wind power installation and a voltage at the grid connector. This is implemented so that the installation reference operating points of all wind power installations together realize the comparison operating point. Thus, what was identified is that the comparison operating point is constructed from the installation reference operating points of all wind power installations, with a phase shift between each wind power installation and the grid connector additionally being considered. Thus, a corresponding reactive power is involved in each case on account of the phase shift. This may occur at the wind power installation, at the grid connector or partially on both sides of the transmission link in each case, that is to say it may occur at the grid connector and at the respective wind power installation. This is taken into consideration in the choice of the installation reference operating points.

Accordingly, at least one of the installation operating points having a reactive power component is also proposed or considered. What was identified here, in particular, is that reactive powers nevertheless may occur, even at the installation reference operating points which should ultimately be constructed to form a comparison operating point without a reactive power infeed. These reactive powers are essentially used to cover or satisfy a reactive power need in a farm grid. This reactive power need may also occur, at least in part, as a reactive power need of individual lines and, as a result, may relate to individual wind power installations. The wind power installations may be installed at different distances from the grid connector and this, in particular, may lead to different reactive power needs and hence also different phase shifts between the respective wind power installation and the grid connector. This should consequently be taken into account.

Moreover, for each installation reference operating point, an installation reference power loss is proposed to be determined from a stored installation reference power loss or is proposed to be determined from a plurality of stored installation reference power losses by interpolation or extrapolation. Details in this respect were already set forth further above.

Additionally, the reactive-power power loss of the wind power system is proposed to be determined from an overall power loss of the current operating point, minus a summation of the installation reference power losses, and plus current transmission losses which arise at the current operating point by the transmission of the reactive power component from the wind power installations to the grid connector. Consequently, current transmission losses are considered, which are specifically assigned only to the transmission of the reactive power component. What was taken into particular consideration here is that such an isolated assignment of transmission losses to a component of the transmitted power is possible to a good approximation. The transmission losses are essentially caused by the power transmission as such. Thus, they are essentially caused by a sinusoidal current component which is transmitted here. It also may come into question here to consider the phase shift between wind power installation and grid connector.

Preferably, the current transmission losses are proposed to be ascertained by a load flow calculation or from the table. Such a load flow calculation allows consideration of the electrical properties of the transmission line or, very generally, the transmission infrastructure between the wind power installations and the grid connector. This is proposed for a wind farm with a plurality of wind power installations in particular and the load flow calculation may in the process consider the superposition from the transmission of the individual wind power installations at corresponding nodes in a farm grid.

An appropriate model of the farm grid, which for example may be created in advance or which may be determined on account of the known physical conditions, may also be used for the load flow calculation. The physical conditions include, in particular, the topology of the farm grid consisting of transmission lines and connection nodes and, additionally, the respective physical properties of the utilized lines, such as cross section and length. The lines may also simply be considered as corresponding impedances only. These impedances are derivable from the physical properties or may be measured.

However, tables may also be determined from preliminary examinations in an alternative. Such tables specify transmission losses for the respective wind power installations depending on the operating point, that is to say depending on active and reactive power. The tables may be created such that they only specify the transmission losses caused by the reactive power component.

What should be considered here is that less reactive power being transmitted at a reference operating point than at the current operating point also comes into question. This may apply to individual wind power installations which, for example, are disposed far away from the grid connector and in the case of which there is consequently a significant phase shift between wind power installation and grid connector. Then, significant amounts of reactive power are output by the wind power installation at the installation reference operating point, specifically to meet the reactive power need of the transmission to the grid connector. What then comes into question at the current operating point is that this wind power installation feeds in less reactive power because the phase shift on the transmission section from this wind power installation to the grid connector leads to a reactive power at the grid connector.

Thus, a situation that may arise in a wind farm for at least one individual wind power installation is one where, in the case of a pure active power infeed, this at least one individual wind power installation generates more reactive power than at a current operating point, at which the wind farm feeds in active power and reactive power. This at least one individual wind power installation will then possibly also have a greater power loss when the farm feeds in pure active power in comparison with the current operating point which also feeds in reactive power.

Consequently, the proposed consideration of the phase shift also considers the amount of reactive power the wind power installation then generates at its respective installation reference operating point and the described effect would be taken into account. Thus, a lower power loss may arise at the current operating point than in the case of the comparison operating point for the individual wind power installation. The power loss arising at the current operating point would be negative in comparison with the comparison operating point at this wind power installation. What also comes into consideration is that this phenomenon sets in not only for an individual wind power installation but that less power loss overall occurs at the current operating point than in the case of the comparison operating point.

Moreover or alternatively, to calculate the reactive-power power loss, reference transmission losses are proposed to be subtracted, the latter forming a summation of transmission losses which may each arise from a transmission of a reactive power component at an installation reference operating point from the respective wind power installation to the grid connector. Thus, what is additionally proposed here is that the reactive power which may occur in each case at an installation reference operating point is considered not only in respect of power losses in the wind power installation but also in respect of its transmission from the wind power installation to the grid connector.

Consequently, these are transmission losses caused by the reactive power transmission in a farm grid, but only as a result of the reactive power arising at the respective installation reference operating point, which may therefore still additionally occur at the comparison operating point. Thus, no reactive power is fed in at the comparison operating point but it may occur within the wind farm and may in the process also lead to transmission losses, and it is precisely these transmission losses that are removed here by calculation.

One aspect proposes that the preliminary examinations are successively repeated in order to gradually record and store more reference values, wherein in particular the preliminary examinations are carried out during running operation when operating points occur, within the scope of which no reactive power is fed in, and/or the preliminary examinations are carried out during running operation, and operating points are temporarily altered such that no reactive power is fed in.

By recording preliminary examinations during the running operation, the wind power installation or the wind farm can consequently be operated entirely normally and a data table can be gradually filled in the process. This is readily possible, in particular, if only active power is frequently fed in. This is because such normal operating points then form potential comparison operating points. The individual wind power installations are then respectively operated at an installation reference operating point and the corresponding reference values can then be recorded.

Should it emerge that reactive power is regularly fed in, for example in the case of some active power setups, and therefore potential comparison operating points seldom occur in this range, it is possible to temporarily alter the operating point temporarily such that no reactive power is fed in, in particular for less than half an hour, in particular for less than ten minutes. What should also be considered here, in particular, is that the request to feed in reactive power is frequently made to many wind farms. If, successively, one of all these wind farms temporarily alters its operating point such that it does not feed in any reactive power, then this may be acceptable or may be compensated by the remaining wind farms, by virtue of these feeding in slightly more reactive power.

Provided is a wind power system comprising at least one wind power installation for feeding electrical power into an electrical supply grid at a grid connector. Consequently, such a wind power system may be an individual wind power installation but, in particular, this relates to a wind farm comprising a plurality of wind power installations which feed into the electrical supply grid at the same grid connector. Should subsequent aspects or above aspects be described for a plurality of wind power installations, this relates to such a wind farm.

The wind power system is prepared to feed electrical power into the electrical supply grid with an active power component and a reactive power component at a current operating point of the wind power system, and to carry out the following steps:

detecting an overall power loss caused by feeding in the electrical power at the current operating point, and estimating a reactive-power power loss caused by feeding in the reactive power component at the current operating point, wherein the reactive-power power loss is determined from a difference between the overall power loss and an active-power power loss assigned to the current operating point, wherein the active-power power loss corresponds to a power loss of a comparison operating point where the same amount of active power is fed in as at the current operating point, but no reactive power is fed in.

The wind power system can be prepared to carry out this method and the aforementioned steps by virtue of a corresponding method with the steps being implemented in a control device of the wind power system. From this, a corresponding control program may be implemented in the process computer and may access information from the at least one wind power installation. In the case of a wind farm, the control device may form, in particular, a central control device of the wind farm, which may therefore also be referred to as central farm controller. This control device or central control device may then access information from all wind power installations, by virtue of being able to at least transmit and receive values, such as control values and measurement values.

In particular, the wind power system, in particular the wind farm, is preferably prepared to carry out a method in accordance with at least one embodiment described above. In particular, the relevant method may be implemented on the control device to this end.

BRIEF DESCRIPTION OF THE SEVERAL VIEWS OF THE DRAWINGS

The invention is explained in more detail below by way of example on the basis of embodiments with reference to the accompanying figures.

DETAILED DESCRIPTION

Figure 1:
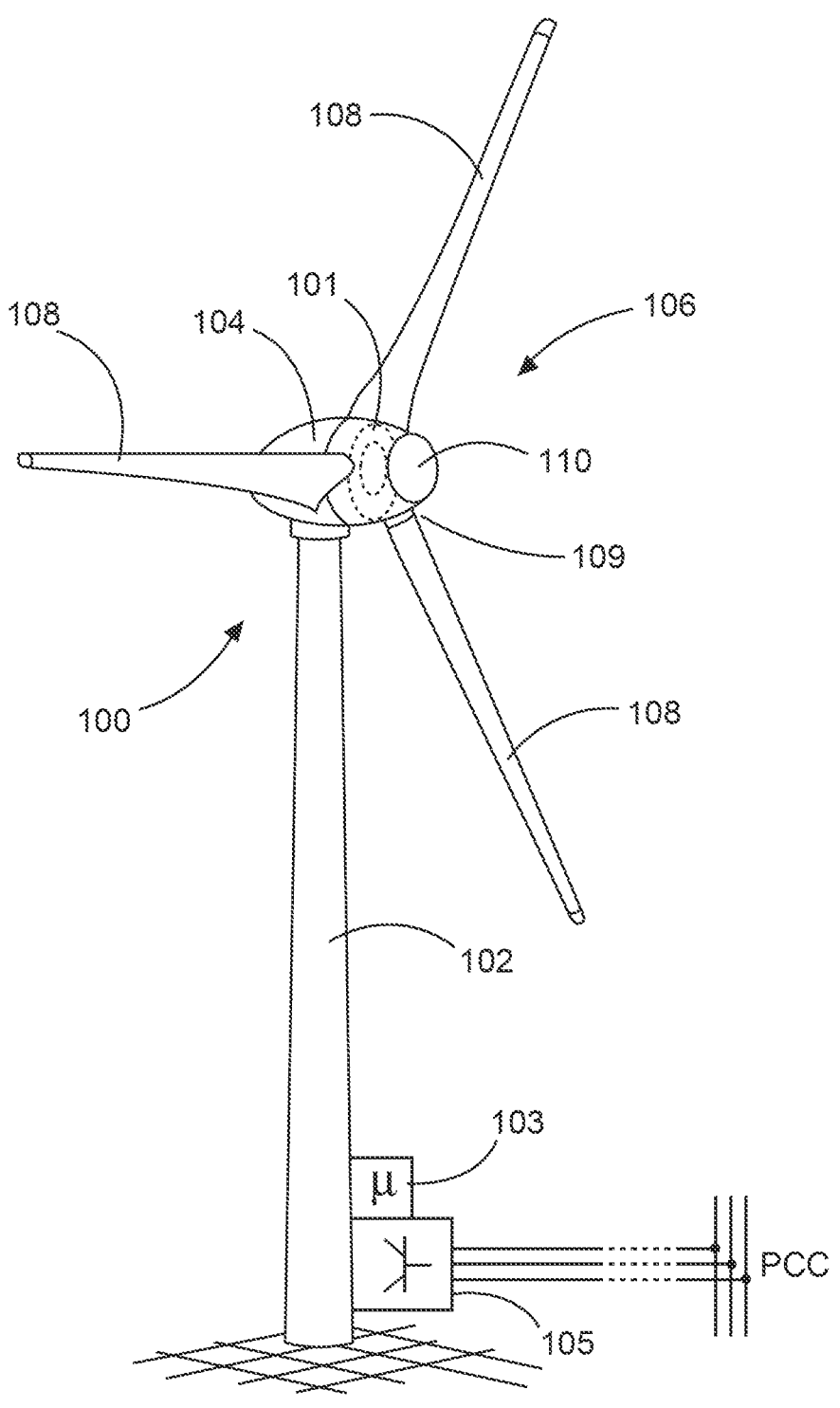
FIG. 1 shows a perspective illustration of a wind power installation.

FIG. 1 shows a schematic illustration of a wind power installation. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 can be varied by pitch motors at the rotor blade roots 109 of the respective rotor blades 108.

The wind power installation 100 in this case has an electric generator 101, which is indicated in the nacelle 104. Electrical power can be generated by means of the generator 101. An infeed unit 105, which can be designed, in particular, as an inverter, is provided to feed in electrical power. It is thus possible to generate a three-phase infeed current and/or a three-phase infeed voltage according to amplitude, frequency and phase, for infeed at a grid connector (e.g, grid connection point or point of common coupling (PCC)). This can be effected directly or else jointly with further wind power installations in a wind farm. An installation control system 103 is provided for controlling the wind power installation 100 and also the infeed unit 105. The installation control system 103 can also receive predefined values from an external source, in particular from a central farm computer.

Figure 2:
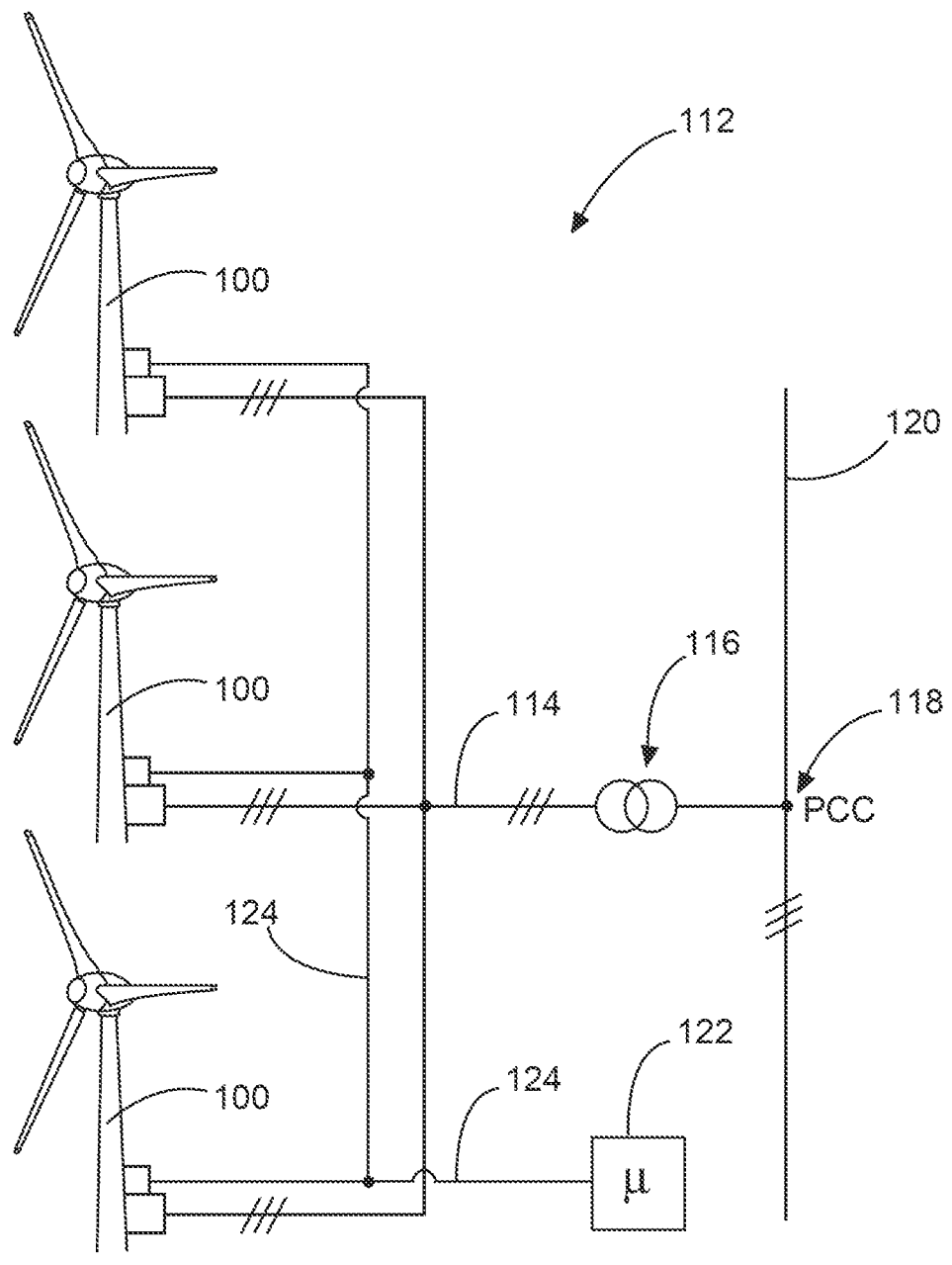
FIG. 2 shows a schematic illustration of a wind farm.

FIG. 2 shows a wind farm 112 having, for example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added and a transformer 116 is usually provided, which steps up the voltage in the farm in order to then feed into the supply grid 120 at the infeed point 118, which is also generally referred to as PCC. FIG. 2 is only a simplified illustration of a wind farm 112, which does not show for example a control system, although a control system is of course present. By way of example, the farm grid 114 may also be designed in another way by virtue of for example a transformer also being present at the output of each wind power installation 100, to mention just one other exemplary embodiment.

Moreover, the wind farm 112 comprises a central farm computer 122, which may have a control device or which may form the control device. This farm computer or the control device may be connected, via data lines 124 or wirelessly, to the wind power installations 100 in order to interchange data with the wind power installations via this connection and, in particular, to receive measurement values from the wind power installations 100 and transmit control values to the wind power installations 100.

Figure 3:
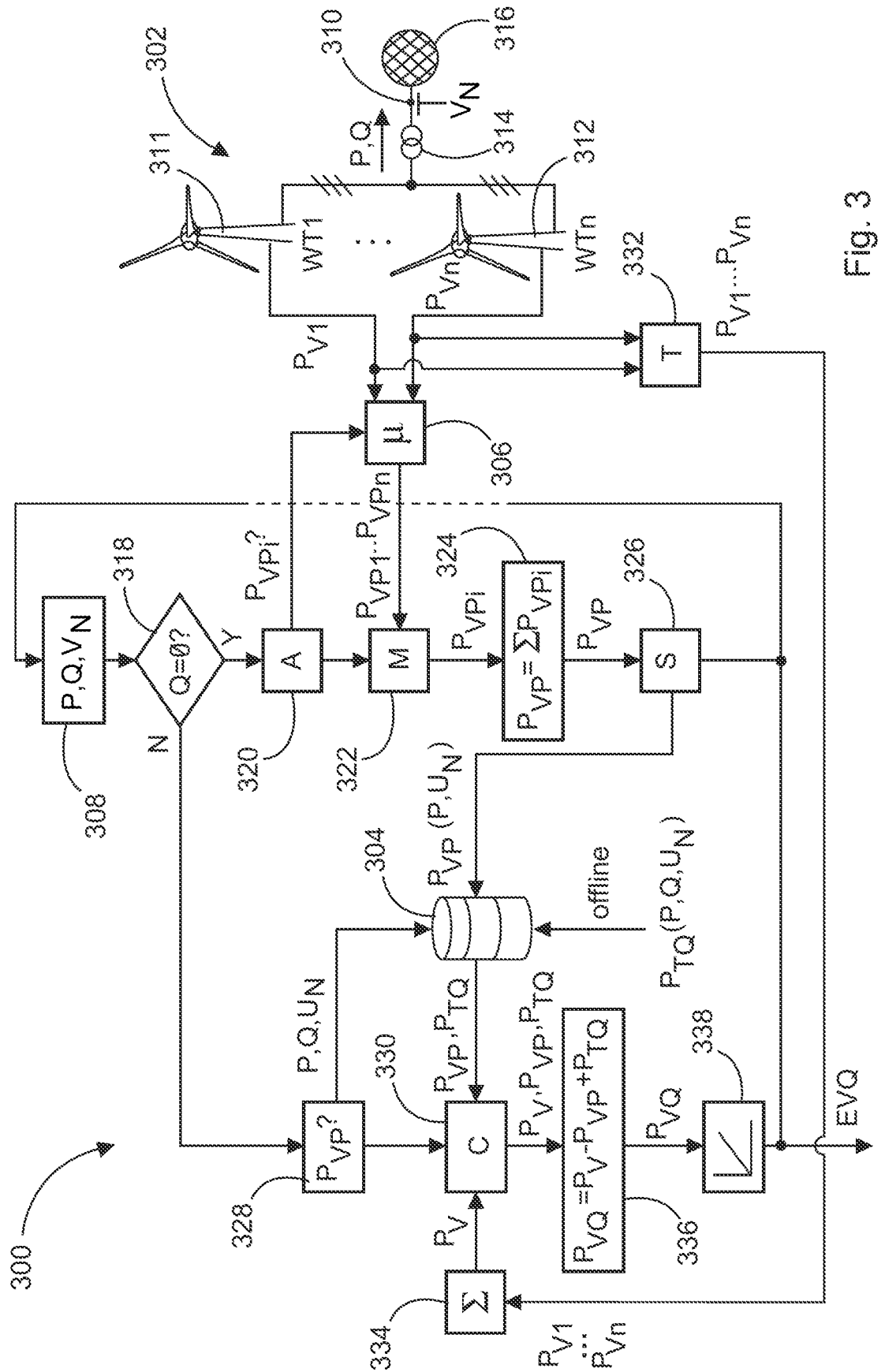
FIG. 3 shows an augmented flow diagram for explaining a method.

FIG. 3 shows an augmented flow diagram 300. This augmented flow diagram 300 shows a flowchart combined with functional elements, including elements of a wind power system 302, and a data memory 304, which may be part of the wind power system 302 and which may also contain a process computer. The wind power system 302 comprises a control device (e.g., controller) 306, which should likewise be understood symbolically. The data memory 304 may be part of the control device 306. Incidentally, the entire procedure elucidated in FIG. 3 can be implemented in the control device 306.

The flow diagram begins with a start block 308, where the procedure may start. In principle, however, the flow diagram 300 shows a procedure that can continue without interruptions. The start block 308 symbolizes the wind power system being operated at an operating point. This operating point is characterized by the fed-in active power P and the fed-in reactive power Q, and by the grid voltage $V_N$ present, which may be detected at the grid node 310, or else at one of the wind power installations 311 or 312. The wind power installations 311 and 312, which are representative of further wind power installations in the wind power system 302, feed into the electrical supply grid 316 via a grid transformer 314 in exemplary fashion here. If the voltage is measured at at least one of the wind power installations 311 or 312, it can naturally be converted in accordance with the turns ratio of the grid transformer 314. The grid node 310 may also be referred to synonymously as grid connector.

The fed-in active power P, fed-in reactive power Q and the grid voltage $V_N$ present are therefore known and significant to the procedure in FIG. 3 as they characterize the current operating point. This is why they are represented in the start block 308.

The fed-in reactive power Q may also have a value of zero. That is to say, no reactive power is then fed in. This is precisely what is queried in the query block (e.g., circuitry) 318.

Should the fed-in reactive power be determined to equal zero in the query block 318, there is the option to record power losses for this case of pure active power infeed. Therefore, the query block 318 then branches to the request block (e.g., circuitry) 320. This request block 320 then transmits a request signal to the control device 306. This query signal contains the query sent to the control device 306 to detect the current power losses of the wind power installations 311 to 312.

Since the case of pure active power infeed now is present, it is consequently substantially installation power losses in the case of active power infeed that are required and are labeled here as $P_{VPi}$. The index i represents the respectively associated wind power installation. The index i may vary from 1 to n and consequently relate to the first to n-th wind power installation. Reactive powers may also be present at the individual wind power installations, which is neglected here for a better overview or which can be included in the installation power loss $P_{VPi}$.

In any case, this query leads to the control device 306 detecting at this time currently detected installation power losses $P_{V1}$ to $P_{Vn}$ from each of the wind power installations 311 to 312. The index P is intended to indicate that the respective power loss is associated with an operating point in the case of active power infeed. However, from the view of each wind power installation, provision can be made for the respective power loss to be detected independently of whether or not an active power operating point is currently present. Therefore, the power losses received by the control device 306 from the wind power installations 311 and 312 are only labeled $P_{V1}$ and $P_{Vn}$.

The control device 306 can then forward the data received thus; however, this should only be done in the case where an operating point of pure active power infeed is present. Therefore, the control device 306 transmits the individual installation active-power power losses $P_{VP1}$ to $P_{VPn}$ to the measurement block (e.g., circuitry) 322. This measurement block 322 then outputs these individual installation active-power power losses $P_{VPi}$ to the first calculation block (e.g., circuitry) 324. In this first calculation block 324, the active-power power loss $P_{VP}$ is calculated from the individual installation active-power power losses $P_{VPi}$ by summation. Consequently, the active-power power loss is the sum of all installation active-power power losses and consequently corresponds to the active-power power loss of a comparison operating point at which no reactive power is fed in.

This active-power power loss $P_{VP}$ is then passed on to the memory block (e.g., memory) 326. In the procedure, the memory block 326 represents storing this active-power power loss for the associated reference operating point. This is because the procedure described up to this point relates to the detection of this active-power power loss of a reference operating point, which is characterized by the fed-in active power P and the currently applied grid voltage $V_N$. Accordingly, the active-power power loss $P_{VP}$ detected thus is passed, together with or depending on the active power P and the applied grid voltage $V_N$, to the data memory 305 and is stored there. In principle, the procedure where no reactive power is fed in, that is to say if Q=0 was detected in the query block 318, is completed. The procedure can return to start block 308.

The current operating point may change, especially as a result of variations in the wind speed or else of the grid voltage from $V_N$, and the loop explained above can be run through again if, in that case, reactive power is still not fed in. Then, a new value for an active-power power loss $P_{VP}$ for an altered operating point characterized by fed-in active power P and the applied grid voltage $V_N$ arises in this way. Accordingly, such an altered further value is entered into the data memory 304. In this way, a database of many values of the active-power power loss for different operating points can be constructed.

If such an active-power power loss is required for a comparison operating point, a value of the associated active-power power loss stored in this respect can be called from the data memory 304 on the basis of the active power P and the grid voltage $V_N$. If the operating point characterized thus is not found exactly, an operating point located in the vicinity can be used. The value for the active-power power loss of this operating point only located in the vicinity can be adapted accordingly. Interpolating, or else extrapolating, between values of the active-power power loss of a plurality of stored operating points also comes into question.

If the feed-in of a reactive power is queried or requested, this leads to the fed-in reactive power in the query block 318 not equaling zero and consequently the query block 318 branching to N (NO) and hence leading to the call block (e.g., circuitry) 328. In the call block 328 calling a stored active-power power loss is initiated or determining the best fitting active-power power loss from stored active-power power losses is initiated.

However, it was also identified that transmission losses may occur as a result of feeding in reactive power. Such transmission losses may depend on the fed-in active power, the fed-in reactive power and the grid voltage $V_N$ present at that time. Such reactive power transmission losses assigned to the reactive power transmission are denoted here as $P_{TQ}$. These may be ascertained in a load flow calculation and/or stored as tables. The stored tables thus may also be the result of a load flow calculation or may have been created differently, for example by simulations.

Here, the assumption is made that the reactive power transmission losses $P_{TQ}$ are stored as tables, specifically depending on the corresponding operating point which is characterized by the fed-in active power P, the fed-in reactive power Q and the associated grid voltage $V_N$. Accordingly, this reactive-power power loss $P_{TQ}$ is provided for storage in the data memory 304 on the basis of these three quantities characterizing the corresponding operating point. This may be implemented once, indicated in FIG. 3 by the term "offline."

It is therefore desirable to also call the reactive power transmission losses $P_{TQ}$ from the data memory 304 in addition to the stored active-power power loss for the current operating point, at which the reactive power is fed in and for which the reactive-power power loss should be determined. Therefore, the call block 328 also transfers the fed-in reactive power Q in addition to the fed-in active power P and the current grid voltage $V_N$.

Using these three input values, the data memory, which may also comprise an appropriate computing unit (e.g., arithmetic logic unit (ALU)) or process computer, can then output the suitable active-power power loss $P_{VP}$ and the reactive power transmission losses $P_{TQ}$ and transmit these to the collection block (e.g., circuitry) 330.

Moreover, the overall power loss $P_V$ is still needed to calculate the power loss which is only assigned to the reactive power component of the current operating point. It may be detected for the entire wind farm or the entire wind power system 302 at the grid connector 310, or it may be considered to calculate it from the individual installation power losses $P_{V1}$ to $P_{Vn}$. For a better overview, this second variant is chosen here, with, likewise for a better overview, possible power losses being neglected. Consequently, the installation power losses $P_{V1}$ to $P_{Vn}$ are given to the combination block (e.g., circuitry) 332 and transmitted in combination to the summation block (e.g., circuitry) 334. By summation, the summation block 334 then calculates the overall power loss $P_V$, which is likewise entered into the collection block 330.

The collection block 330 then transfers the information collected thus, specifically the overall power loss $P_V$, the active-power power loss $P_{VP}$ and the reactive-power transmission losses $P_{TQ}$, to the second calculation block (e.g., circuitry) 336. The reactive-power power loss $P_{VQ}$ can then be calculated in the second calculation block 336, specifically according to the formula:

$$P_{VQ}=P_V-P_{VP}+P_{TQ}$$

The second calculation block 336 consequently outputs the reactive-power power loss $P_{VQ}$. It can additionally be provided via the integrator block (e.g., circuitry) 338 in order to calculate the reactive-power energy loss $E_{VQ}$ from the reactive-power power loss $P_{VQ}$, said reactive-power energy loss consequently being output from said integrator block 338.

Consequently, the integrator block 338 also forms the end of this part of the procedure, in which the reactive-power power loss $P_{VQ}$ or the reactive-power energy loss $E_{VQ}$ is calculated for a current operating point, at which reactive power is fed in. This loop then likewise returns to the start block 308 and the procedure can then start from the beginning. The operating point may have changed and necessitate a renewed calculation of a reactive-power power loss even if reactive power is fed in, that is to say Q is not equal to zero in the query block 318.

Figure 4:
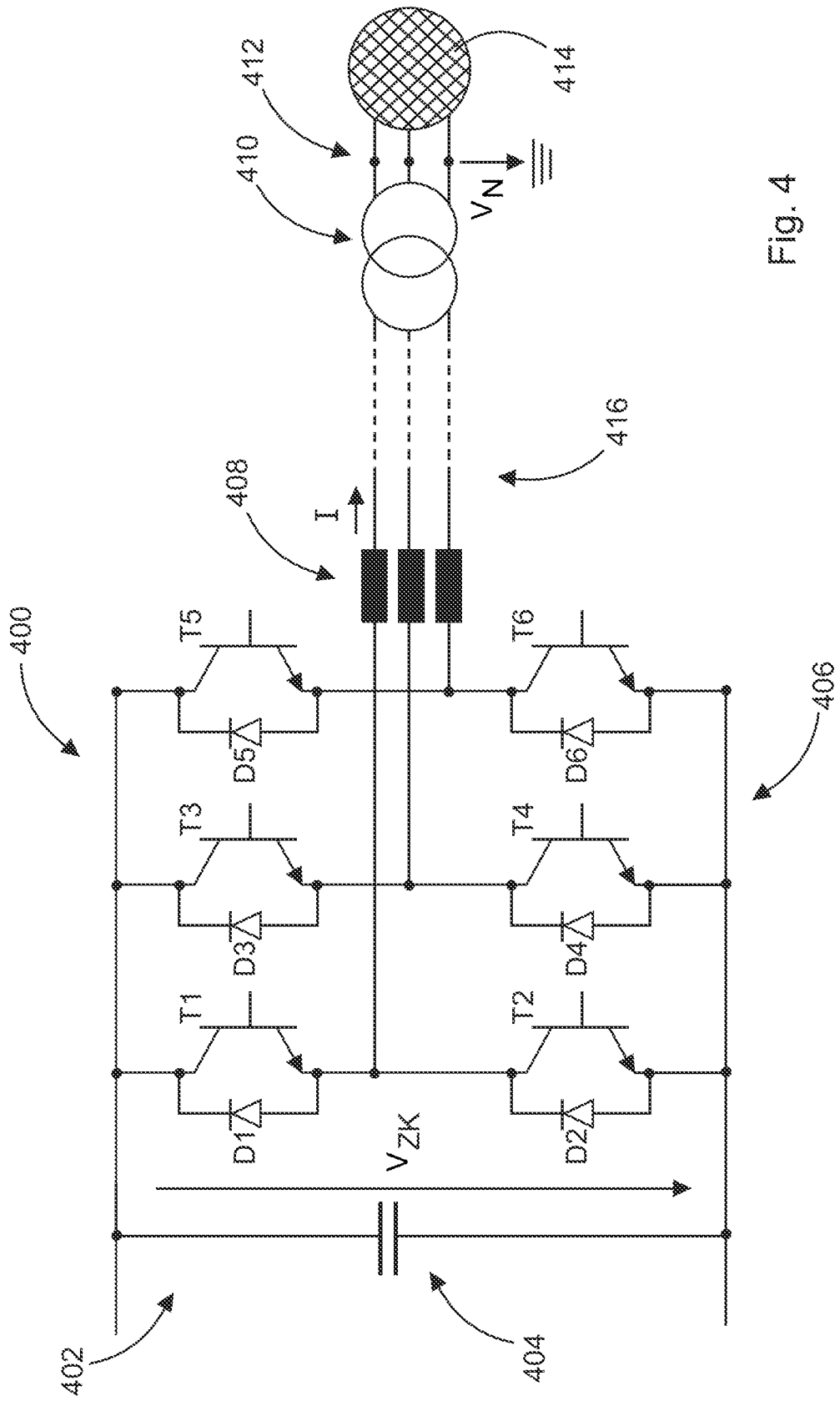
FIG. 4 shows a schematic illustration of elements of a wind power system where power losses may occur.

FIG. 4 schematically shows part of an inverter 400, which may be part of a feed-in device of a wind power installation. The inverter 400 has a DC link 402, for which a DC link capacitor 404 is illustrated. There is a DC link voltage $V_{ZK}$ drop across the DC link 402 and hence across the DC link capacitor 404.

Otherwise, what is known as a B6 bridge 406 is illustrated, having six transistors T1 to T6 and six associated freewheeling diodes D1 to D6.

By way of an appropriate modulation method, also with the aid of the output choke 408, this B6 bridge generates a three-phase, approximately sinusoidal current I. The latter can, optionally after a transformation by way of a transformer 410, then be fed into the electrical supply grid 414 at the grid connector 412. A grid voltage $V_N$ is applied to the grid connector 412 and is likewise plotted here symbolically as voltage with respect to ground. However, it is also possible to use a phase-to-phase voltage. In any case, this grid voltage $V_N$ may co-determine the operating point. Additional powers, that is to say from additional wind power installations, that is to say from additional inverters to only the inverter 400, can be fed in at the grid connector 412.

The transmission line 416 therefore facilitates a transmission of the current I to be fed in, from the output choke 408 to the transformer 410. The transmission line 416 is represented in part by dashed lines, in order to symbolize that a greater distance may be present here, and the transmission line may therefore be very long. Here, the transmission line may have an inductive behavior or else a capacitive behavior, depending on how the line is formed. As a result, phase shifts may also arise between the output choke 408 and the transformer 410, and hence also between said output choke and the grid connector 412. Accordingly, phase shifts therefore arise between an output of a wind power installation and a, or the, grid connector 412.

Power losses of the wind power installation may arise, in particular, at the shown inverter 400 or the illustrated section, and partially also at the shown output choke 408. In particular, individual power losses may respectively occur at each of the transistors T1 to T6. Likewise, power losses may occur at each of the diodes D1 to D6. Power losses may also arise at each limb of the three phases of the output choke 408. All these power losses, that is to say all these individual power losses in particular, may be added together and yield an installation power loss $P_{Vi}$.

If, as is conventional, the wind power installation has a plurality of inverters like the inverter 400, these power losses of all of these inverters should be added together. Further power losses may also be added but, as a rule, the most essential power losses should have been covered by the aforementioned ones. Power losses may also occur on the generator side; however, these are not mentioned here because they only change with the generated active power and not with the fed-in reactive power. At best, small effects come into consideration here, as a result of the fact that the DC link voltage may possibly have to be changed slightly due to the reactive power infeed, and this may also have an influence on the generator side. A decision can be made in the individual case as to whether such losses are negligible.

It may be expedient to consider certain information items, such as the DC link voltage $V_{ZK}$ or else a switching frequency with which the B6 bridge 406 is driven, and for example store these in a table. Specifically, what can then be considered is that a specific power loss in each of these specified components need not be measured again if an already measured operating point sets in. Such an operating point may be characterized by the DC link voltage $V_{ZK}$, the switching frequency and optionally an external temperature. Naturally, it is also characterized by the level of the fed-in active power or apparent power, or the fed-in current.

As a result of the reactive power infeed, a power loss assigned to this reactive power may also arise on the transmission line 416. This power loss can likewise be detected and can be output, in particular in separate fashion. At least, it may depend on a phase shift between the output choke 408 and the transformer 410 or the grid connector 412, and may be determined on the basis thereof. This determination can also be carried out elsewhere.

Consequently, a solution is proposed, by means of which, in particular, it is possible to obtain the detection of the actual losses in the power cabinets, the ascertainment of the reactive power-caused component and the integration of the additional energy loss amount as a result of a reactive power provision.

Moreover, it is an object by way of a learning method to detect the minimal losses in the case of a pure active power infeed (either at the grid node (NVP) or at the installation terminals) and determine the additional losses by the current reactive power operating point on the basis of the absolute current losses and the stored minimal losses.

The detection of the actual semiconductor losses by way of an online loss model at an installation level, that is to say in or for each wind power installation, is proposed in particular. Where possible, all boundary conditions should be detected. These include the voltage on the grid, the voltage in the DC circuit (DC circuit voltage), and the temperature of cooling water and semiconductor layers.

The detection or measurement of losses is proposed, specifically a calculation of forward power losses of semiconductors, and also of chokes and further components. In particular, the calculation of the switching losses in each switching process is proposed, specifically for insulated-gate bipolar transistors (IGBTs) and diodes of the inverters.

Further, the detection of the operating point (active and reactive current, grid voltage) is proposed, as is the detection and storage of the losses (reference losses) in the case of a pure active power provision (either at the grid node (NVP) or at the output of each wind power installation, that is to say the WPI terminals).

As a further step, the detection of the absolute losses in the case of a provision of active and reactive power and the subtraction of the reference losses at the active power operating point in order to determine the reactive power-caused losses is proposed. This may then be followed by the integration over time of the reactive power-caused overall losses.

A reactive power detection on the farm level is proposed as a special additional aspect. If the reference losses are determined for Q=0 at the grid node (NVP), then the reference of the operating points at the inverter terminals forms a shift curve, according to which deviations of the reactive power in relation to the grid node may arise at each wind power installation, said deviations possibly depending on the location of the wind power installation and the transmitted active power. Consequently, shifts occur on account of the farm impedance. Consequently, the current losses in relation to the reference on the level of the wind power installations (WPI level) may therefore also be negative.

However, in this respect it was also identified that it may be expedient to consider reactive power-caused losses in the farm grid. Such consideration may be implemented by way of a table (lookup table). Such a table may specify values of the power loss on the basis of the respective operating point, either for each wind power installation or for the wind farm overall.

The overall losses may be calculated and integrated using these additional reactive power-caused losses on the farm level. One suggestion is that such a method, which may be referred to as a reactive power meter, also stores the amount of reactive energy in addition to the summed energy loss and, for example, 15-minute averages of the reactive power exchanged.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining power loss when operating a wind farm, wherein the wind farm includes a plurality of wind power installations, and at least one wind power installation is configured to feed electrical power into an electrical supply grid at a grid connection point, wherein the electrical power has an active power component and a reactive power component at a current operating point of the wind farm, and the method comprises:

determining an overall power loss caused by feeding the electrical power at the current operating point;

determining a reactive power loss caused by the feeding of the reactive power component at the current operating point, wherein the reactive power loss is determined from a difference between the overall power loss and an active power loss assigned to the current operating point, wherein the active power loss corresponds to a power loss of a comparison operating point having a same amount of active power fed in as the current operating point and having no reactive power fed in; and transmitting at least one control value to at least one of the plurality of wind power installations, wherein the at least one control value is based on the reactive power loss caused by the feeding of the reactive power component at the current operating point, wherein the method includes:

determining the overall power loss at the current operating point based on transmission losses between the at least one wind power installation and the grid connection point;

determining the active power loss at a reference operating point based on the transmission losses between the at least one wind power installation and the grid connection point; or determining an installation reference power loss at a reference installation operating point based on the transmission losses between a respective wind power installation and the grid connection point;

determining the reactive power loss for each wind power installation of the plurality of wind power installations by at least:

determining, for each wind power installation of the plurality of wind power installations, an installation reference operating point based on active power of the current operating point and a phase shift between an output voltage at the at least one wind power installation and a voltage at the grid connection point, wherein:

installation reference operating points of the plurality of wind power installations form the comparison operating point, at least one of a plurality of installation operating points has a reactive power component, and for each of a plurality of installation reference operating points, an installation reference power loss is determined from a stored installation reference power loss or a plurality of stored installation reference power losses by interpolation or extrapolation; and determining the reactive power loss of the wind farm is determined from the overall power loss of the current operating point minus a sum of the plurality of stored installation reference power losses and plus current transmission losses arising at the current operating point by transmission of the reactive power component from the plurality of wind power installations to the grid connection point.

2. The method as claimed in claim 1, comprising:

performing a plurality of preliminary examinations at a plurality of reference operating points, each preliminary examination of the plurality of preliminary examinations having active power fed in and no reactive power fed in;

for each preliminary examination of the plurality of preliminary examinations, determining a power loss as a reference power loss; and for each preliminary examination of the plurality of preliminary examinations, storing the reference power loss and active power of the reference operating point as reference values.

3. The method as claimed in claim 2, comprising:

storing the reference power loss and the active power of each reference operating point together with one or more operating point boundary conditions of the reference operating point.

4. The method as claimed in claim 2, comprising:

determining the active power loss of the current operating point from a stored reference power loss of a reference operating point of the plurality of reference operating points by:

selecting the reference operating point based on the current operating point and using the stored reference power loss of the reference operating point as the active power loss or extrapolating the active power loss from the stored reference power loss; or selecting a set of reference operating points of the plurality of reference operating points based on the current operating point, and interpolating or extrapolating the active power loss from reference power losses of the set of reference operating point.

5. The method as claimed in claim 1, comprising:

performing a plurality of preliminary examinations for determining the active power loss, each wind power installation of the plurality of wind power installations is respectively operated at at least one installation reference operating point with an installation active power, a power loss of the at least one wind power installation is detected as an installation reference power loss, and the installation reference power loss and the installation active power are stored.

6. The method as claimed in claim 5, wherein the installation reference power loss and the installation active power are stored with an output reactive power and/or at least one operating point boundary condition.

7. The method as claimed in claim 6, wherein:

the active power loss of the current operating point is determined, for each wind power installation of the plurality of wind power installations, from the stored installation reference power loss, the stored installation reference power loss is extrapolated for each wind power installation based on the active power component of the current operating point or is determined from a plurality of stored installation reference power losses by interpolation or extrapolation, and the active power loss is determined from a sum of all installation reference power losses.

8. The method as claimed in claim 1, wherein:

the comparison operating point and the current operating point are determined from installation operating points, the active power component of the current operating point or of the comparison operating point is determined from a sum of active powers of the installation operating points of the plurality of wind power installations, and the reactive power component of the current operating point or of the comparison operating point is determined from a sum of reactive powers of the installation operating points of the plurality of wind power installations and a reactive power requirement of a farm grid.

9. The method as claimed in claim 3, wherein the one or more operating point boundary conditions are:
a grid voltage of the electrical supply grid,
a reactive power generated by the at least one wind power installation,
a DC link voltage of an inverter of the at least one wind power installation, or
an external temperature.

10. The method as claimed in claim 1, comprising:
determining power losses of the at least one wind power installation using a power loss boundary conditions determined from:
a grid voltage of the electrical supply grid,
a DC link voltage of an inverter of the at least one wind power installation,
a cooling water temperature of the inverter of the at least one wind power installation,
a temperature of at least one semiconductor switch of the inverter of the at least one wind power installation,
a switching frequency of the inverter, and
a current tolerance bandwidth of the inverter.

11. The method as claimed in claim 1, comprising:
determining power losses of the at least one wind power installation including:
forward power losses of the at least one wind power installation, or
switching losses of the at least one wind power installation.

12. The method as claimed in claim 11, wherein:
the forward power losses are associated with semiconductors and diodes of an inverter arrangement, losses at chokes at an output of the inverter arrangement or losses in lines between the at least one wind power installation and the grid connection point, or
the switching losses are associated with the semiconductors of the inverter arrangement and/or the diodes of the inverter arrangement.

13. The method as claimed in claim 1, wherein:
the reactive power loss is integrated over time to determine a reactive power energy loss caused by feeding a reactive power, or
the overall power loss is determined at the grid connection point, or installation power losses are respectively determined at an output of each wind power installation of the plurality of wind power installations.

14. The method as claimed in claim 1, wherein:
a respective installation reactive power loss is determined for each wind power installation of the plurality of wind power installations and integrated over time to form an installation reactive power energy loss,
the respective installation reactive power loss is determined from a difference between a power loss of the at least one wind power installation at the current operating point and an installation reference power loss, which is derived from a stored installation reference power loss or determined from a plurality of stored installation reference power losses by interpolation or extrapolation, and
a reactive power energy loss of the wind farm is formed as a sum of installation reactive power energy losses of the plurality of wind power installations.

15. The method as claimed in claim 1, comprising:
determining the current transmission losses based on a load flow calculation or from a table, wherein to calculate the reactive power loss, reference transmission losses are subtracted and form a sum of transmission losses which each arise from a transmission of a reactive power component at an installation reference operating point from the respective wind power installation to the grid connection point.

16. The method as claimed in claim 1, wherein:
preliminary examinations are successively repeated in order to gradually record and store reference values,
the preliminary examinations are carried out during running operation when operating points occur, within a scope of which no reactive power is fed in, and/or
the preliminary examinations are carried out during running operation, and operating points are temporarily altered such that no reactive power is fed in.

17. A wind farm comprising:
a plurality of wind power installations, wherein at least one wind power installation of the plurality of wind power installations is configured to feed electrical power into an electrical supply grid at a grid connection point, the electrical power having an active power component and a reactive power component at a current operating point of the wind farm; and
a controller configured to:
determine an overall power loss caused by feeding the electrical power at the current operating point;
determine a reactive power loss caused by the feeding of the reactive power component at the current operating point; and
transmit at least one control value to at least one of the plurality of wind power installations, wherein the at least one control value is based on the reactive power loss caused by the feeding of the reactive power component at the current operating point, wherein:
the reactive power loss is determined from a difference between the overall power loss and an active power loss assigned to the current operating point, and
the active power loss corresponds to a power loss of a comparison operating point having a same amount of active power fed in as the current operating point and having no reactive power fed in,
wherein the controller is configured to:
determine the overall power loss at the current operating point based on transmission losses between the at least one wind power installation and the grid connection point;
determine the active power loss at a reference operating point based on the transmission losses between the at least one wind power installation and the grid connection point; or
determine an installation reference power loss at a reference installation operating point based on the transmission losses between a respective wind power installation and the grid connection point;
determine the reactive power loss for each wind power installation of the plurality of wind power installations by at least:
determine, for each wind power installation of the plurality of wind power installations, an installation reference operating point based on active power of the current operating point and a phase shift between an output voltage at the at least one wind power installation and a voltage at the grid connection point, wherein:

installation reference operating points of the plural-
ity of wind power installations form the compari-
son operating point,
at least one of a plurality of installation operating
points has a reactive power component, and
for each of a plurality of installation reference oper-
ating points, an installation reference power loss is
determined from a stored installation reference
power loss or a plurality of stored installation
reference power losses by interpolation or
extrapolation; and
determine the reactive power loss of the wind farm
is determined from the overall power loss of the
current operating point minus a sum of the plu-
rality of stored installation reference power losses
and plus current transmission losses arising at the
current operating point by transmission of the
reactive power component from the plurality of
wind power installations to the grid connection
point.

* * * * *